United States Patent
Yoneda et al.

(10) Patent No.: US 8,179,453 B2
(45) Date of Patent: May 15, 2012

(54) IMAGING METHOD AND IMAGING APPARATUS

(75) Inventors: Masato Yoneda, Chiba (JP); Toshio Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/805,159

(22) Filed: Jul. 15, 2010

(65) Prior Publication Data

US 2010/0277621 A1 Nov. 4, 2010

Related U.S. Application Data

(62) Division of application No. 11/259,198, filed on Oct. 27, 2005, now Pat. No. 7,782,376.

(30) Foreign Application Priority Data

Oct. 29, 2004 (JP) .................................. 2004-316675

(51) Int. Cl.
*H04N 5/262* (2006.01)
*H04N 5/228* (2006.01)
*H04N 5/235* (2006.01)
*H04N 5/76* (2006.01)
*H04N 5/335* (2011.01)
*H04N 5/238* (2006.01)
*G03B 7/00* (2006.01)

(52) U.S. Cl. ............ 348/240.2; 348/208.99; 348/208.12; 348/222.1; 348/229.1; 348/231.2; 348/240.99; 348/239; 348/294; 348/297; 348/302; 348/362; 348/367

(58) Field of Classification Search ............. 348/208.99, 348/208.12, 220.1–222.1, 229.1, 230.1, 231.99–231.2, 348/240.99–240.3, 239, 294, 296–297, 302, 348/362–367; 396/60, 379; 382/293–300
See application file for complete search history.

(56) References Cited

U.S. PATENT DOCUMENTS 4,504,865 A 3/1985 Nishizawa et al.
(Continued)

FOREIGN PATENT DOCUMENTS

JP 07-322123 A 12/1995
(Continued)

OTHER PUBLICATIONS

Japanese Office Action issued Sep. 29, 2009 for corresponding Japanese Application No. 2004-316675.
(Continued)

*Primary Examiner* — Jason Chan
*Assistant Examiner* — Michael Osinski
(74) *Attorney, Agent, or Firm* — Rader Fishman & Grauer, PLLC

(57) ABSTRACT

An imaging method includes a step of setting, when a digital zoom operation mode for enlarging an image imaged by a imaging part of an X-Y address type is selected, a zoom magnification and enlarging the image at the zoom magnification set. The imaging method includes the steps of: setting an imaging range in a vertical direction of the imaging part according to the zoom magnification set in the digital zoom step; outputting a driving signal for scanning the shutter signal and the readout signal to perform exposure in the imaging range set in the imaging range setting step and driving the imaging part; and discarding, when the zoom magnification is changed in the digital zoom step, images imaged by the imaging part before and after the change of the zoom magnification to prevent the images from being used.

7 Claims, 7 Drawing Sheets

U.S. PATENT DOCUMENTS

| | | |
|---|---|---|
| 6,750,903 B1 | 6/2004 | Miyatake et al. |
| 7,231,100 B2 | 6/2007 | Pilu |
| 7,355,643 B2 | 4/2008 | Shimomura et al. |
| 7,589,778 B2 * | 9/2009 | Nakahira ................ 348/333.01 |
| 8,077,225 B2 * | 12/2011 | Nakayama ................ 348/240.1 |
| 2001/0024234 A1 | 9/2001 | Kubo |
| 2003/0043292 A1 | 3/2003 | Pyle et al. |
| 2004/0095485 A1 | 5/2004 | Ueda et al. |
| 2004/0239780 A1 | 12/2004 | Nakahira |
| 2005/0068426 A1 | 3/2005 | Kawasaki et al. |
| 2005/0083419 A1 | 4/2005 | Honda et al. |
| 2005/0099514 A1 | 5/2005 | Cozier et al. |
| 2007/0081081 A1 | 4/2007 | Cheng |
| 2007/0257996 A1 * | 11/2007 | Kurosawa et al. ....... 348/240.99 |
| 2008/0158393 A1 | 7/2008 | Taoka et al. |

FOREIGN PATENT DOCUMENTS

| | | |
|---|---|---|
| JP | 2000-209503 A | 7/2000 |
| JP | 2002-165136 A | 6/2002 |
| JP | 2002-314870 A | 10/2002 |
| JP | 2002-330329 A | 11/2002 |
| JP | 2003-153078 | 5/2003 |
| JP | 2003-179799 | 6/2003 |

OTHER PUBLICATIONS

Japanese Office Action issued Dec. 20, 2012 for related Japanese Application No. 2008-250850.

* cited by examiner

MAGNIFICATION B

|  | 1 | 1.2 | 1.4 | 1.6 | 1.8 | 2 | 3 | 4 | 6 | 8 | 10 | 16 |
|---|---|---|---|---|---|---|---|---|---|---|---|---|
| 1 | 1.00 | 0.92 | 0.86 | 0.81 | 0.78 | 0.75 | 0.67 | 0.63 | 0.58 | 0.56 | 0.55 | 0.53 |
| 1.2 | 0.92 | 1.00 | 0.93 | 0.88 | 0.83 | 0.80 | 0.70 | 0.65 | 0.60 | 0.58 | 0.56 | 0.54 |
| 1.4 | 0.86 | 0.93 | 1.00 | 0.94 | 0.89 | 0.85 | 0.73 | 0.68 | 0.62 | 0.59 | 0.57 | 0.54 |
| 1.6 | 0.81 | 0.88 | 0.94 | 1.00 | 0.94 | 0.90 | 0.77 | 0.70 | 0.63 | 0.60 | 0.58 | 0.55 |
| 1.8 | 0.78 | 0.83 | 0.89 | 0.94 | 1.00 | 0.95 | 0.80 | 0.73 | 0.65 | 0.61 | 0.59 | 0.56 |
| 2 | 0.75 | 0.80 | 0.85 | 0.90 | 0.95 | 1.00 | 0.83 | 0.75 | 0.67 | 0.63 | 0.60 | 0.56 |
| 3 | 0.67 | 0.70 | 0.73 | 0.77 | 0.80 | 0.83 | 1.00 | 0.88 | 0.75 | 0.69 | 0.65 | 0.59 |
| 4 | 0.63 | 0.65 | 0.68 | 0.70 | 0.73 | 0.75 | 0.88 | 1.00 | 0.83 | 0.75 | 0.70 | 0.63 |
| 6 | 0.58 | 0.60 | 0.62 | 0.63 | 0.65 | 0.67 | 0.75 | 0.83 | 1.00 | 0.88 | 0.80 | 0.69 |
| 8 | 0.56 | 0.58 | 0.59 | 0.60 | 0.61 | 0.63 | 0.69 | 0.75 | 0.88 | 1.00 | 0.90 | 0.75 |
| 10 | 0.55 | 0.56 | 0.57 | 0.58 | 0.59 | 0.60 | 0.65 | 0.70 | 0.80 | 0.90 | 1.00 | 0.81 |
| 16 | 0.53 | 0.54 | 0.54 | 0.55 | 0.56 | 0.56 | 0.59 | 0.63 | 0.69 | 0.75 | 0.81 | 1.00 |

MAGNIFICATION A

IMAGING METHOD AND IMAGING APPARATUS

CROSS-REFERENCES TO RELATED APPLICATIONS

The present application is a divisional of application Ser. No. 11/259,198, filed on Oct. 27, 2005, the entirety of which being incorporated herein by reference. The present application contains subject matter related to Japanese Patent Application JP 2004-316675 filed in the Japanese Patent Office on Oct. 29, 2004, the entire contents of which being incorporated herein by reference.

BACKGROUND OF THE INVENTION

1. Field of the Invention

The present invention relates to an imaging apparatus and an imaging method for performing a digital zoom for enlarging an image imaged by imaging part of an X-Y address type.

2. Description of the Related Art

There is known an imaging apparatus that performs a digital zoom for enlarging an image imaged by a imaging part like a video camera, a digital camera, an imaging unit of a cellular phone, and the like. The imaging apparatus of the related art stores an image imaged by the imaging part in a memory and, then, slices an image in a zoom range to apply expansion processing to the image (see JP-A-2003-179799 and JP-A-2003-153078).

SUMMARY OF THE INVENTION

However, since the imaging apparatus of the related art stores an image imaged by the imaging part in a memory and, then, slices an image in a zoom range to apply expansion processing to the image, a storage capacity of the memory increases, resulting in an increase in cost of the imaging apparatus.

The invention has been devised in view of such circumstances. It is desirable to provide an imaging apparatus and an imaging method that can reduce a storage capacity of a memory by reading out an image in an imaging range corresponding to a zoom magnification at the time of an operation of digital zoom to thereby reduce cost of the imaging apparatus.

According to an embodiment of the invention, there is provided an imaging method including a step of setting a zoom magnification when a digital zoom operation mode for enlarging an image imaged by a imaging part of an X-Y address type, in which an exposure time is controlled by a shutter signal for starting exposure for scanning plural pixels arranged in a matrix shape in a vertical direction and a readout signal for ending the exposure, and enlarging the image imaged by the imaging part at the set zoom magnification. The imaging method includes the steps of: setting an imaging range in a vertical direction of the imaging part according to the zoom magnification set in the digital zoom step; outputting a driving signal for scanning the shutter signal and the readout signal to perform exposure in the imaging range set in the imaging range setting step and driving the imaging part; and discarding, when the zoom magnification is changed in the digital zoom step, images imaged by the imaging part before and after the change of the zoom magnification to prevent the images from being used.

An imaging apparatus according to an embodiment of the invention is an imaging apparatus including: a imaging part of an X-Y address type having plural pixels arranged in a matrix shape, a scanning circuit for shutter scanning a shutter signal for discharging accumulated signal charges and starting exposure in a vertical direction of the plural pixels by a unit of a row, and a scanning circuit for readout scanning a readout signal for ending the exposure and reading out accumulated signal charges in the vertical direction of the plural pixels by a unit of a row, an exposure time of the imaging part being controlled by the shutter signal and the readout signal; an exposure time setting portion for setting an exposure time of the imaging part; and a digital zoom portion for setting a zoom magnification when a digital zoom operation mode is selected for enlarging an image imaged by the imaging part, and enlarging the image imaged by the imaging part at the set zoom magnification. The imaging apparatus includes: imaging range setting portion for setting an imaging range in a vertical direction of the imaging part according to the zoom magnification set by the digital zoom portion; a driving portion for outputting a driving signal for a shutter for causing the scanning circuit for the shutter to scan a shutter signal and causing the scanning circuit for readout to scan a readout signal to perform exposure in the imaging range set by the imaging range setting portion at the exposure time set by the exposure time setting portion and driving the imaging part; and a first discarding portion for discarding, when the zoom magnification is changed by the digital zoom portion, images imaged by the imaging part before and after the change of the zoom magnification to prevent the images from being used.

An imaging method according to an embodiment of the invention is an imaging method including the steps of: setting an exposure time of a imaging part of an X-Y address type, in which an exposure time is controlled by a shutter signal for starting exposure for scanning plural pixels arranged in a matrix shape in a vertical direction and a readout signal for ending the exposure; and setting a zoom magnification when a digital zoom operation mode is selected for enlarging an image imaged by a imaging part, and enlarging the image imaged by the imaging part at the zoom magnification set. The imaging method includes the steps of: setting an imaging range in a vertical direction of the imaging part according to the zoom magnification set in the digital zoom step; outputting a driving signal for scanning the shutter signal and the readout signal to perform exposure in the imaging range set in the imaging range setting step at the exposure time set in the exposure time setting step and driving the imaging part; calculating, when the zoom magnification is changed in the digital zoom step, a maximum exposure time of the imaging part on the basis of the zoom magnifications before the change and after the change to prevent a shutter signal for scanning the imaging range corresponding to the zoom magnification after the change from interfering with a readout signal for scanning the imaging range corresponding to the zoom magnification before the change; and comparing the maximum exposure time calculated in the calculating step and the exposure time set in the exposure time setting step and discarding, when the exposure time set in the exposure time setting step exceeds the maximum exposure time calculated in the calculating step, images imaged by the imaging part before and after the change of the zoom magnification to prevent the images from being used.

An imaging apparatus according to an embodiment of the invention is an imaging apparatus including: a imaging part of an X-Y address type having plural pixels arranged in a matrix shape, a scanning circuit for shutter scanning a shutter signal for discharging accumulated signal charges and starting exposure in a vertical direction of the plural pixels by a unit of a row, and a scanning circuit for readout scanning a readout signal for ending the exposure and reading out accumulated signal charges in the vertical direction of the plural pixels by a unit of row, an exposure time of the imaging part being controlled by the shutter signal and the readout signal; an exposure time setting portion for setting an exposure time of the imaging part; and a digital zoom portion for setting, when a digital zoom operation mode for enlarging an image imaged by the imaging part is selected, a zoom magnification and enlarging the image imaged by the imaging part at the zoom magnification set. The imaging apparatus includes: an imaging range setting portion for setting an imaging range in a vertical direction of the imaging part according to the zoom magnification set by the digital zoom unit; a driving portion for outputting a driving signal for shutter for causing the scanning circuit for shutter to scan a shutter signal and causing the scanning circuit for readout to scan a readout signal to perform exposure in the imaging range set by the imaging range setting unit at the exposure time set by the exposure time setting unit and driving the imaging part; a calculating unit calculating, when the zoom magnification is changed by the digital zoom unit, a maximum exposure time of the imaging part on the basis of the zoom magnifications before the change and after the change to prevent a shutter signal for scanning the imaging range corresponding to the zoom magnification after the change from interfering with a readout signal for scanning the imaging range corresponding to the zoom magnification before the change; and a first discarding unit comparing the maximum exposure time calculated by the calculating unit and the exposure time set by the exposure time setting unit and discarding, when the exposure time set by the exposure time setting unit exceeds the maximum exposure time calculated by the calculating unit, images imaged by the imaging part before and after the change of the zoom magnification to prevent the images from being used.

An imaging method according to an embodiment of the invention is an imaging method including the steps of: setting an exposure time of a imaging part of an X-Y address type, in which an exposure time is controlled by a shutter signal for starting exposure for scanning plural pixels arranged in a matrix shape in a vertical direction and a readout signal for ending the exposure; and setting, when a digital zoom operation mode for enlarging an image imaged by a imaging part is selected, a zoom magnification and enlarging the image imaged by the imaging part at the zoom magnification set. The imaging method includes the steps of: setting an imaging range in a vertical direction of the imaging part according to the zoom magnification set in the digital zoom step; and outputting a driving signal for scanning the shutter signal and the readout signal to perform exposure in the imaging range set in the imaging range setting step at the exposure time set in the exposure time setting step and driving the imaging part. The exposure time setting step includes a step of calculating, when the zoom magnification is changed in the digital zoom step, a maximum exposure time of the imaging part on the basis of the zoom magnifications before the change and after the change to prevent a shutter signal for scanning the imaging range corresponding to the zoom magnification after the change from interfering with a readout signal for scanning the imaging range corresponding to the zoom magnification before the change. In the exposure time setting step, an exposure time of the imaging part is set not to exceed the maximum exposure time calculated in the calculating step.

An imaging apparatus according to an embodiment of the invention is an imaging apparatus including: an imaging part of an X-Y address type having plural pixels arranged in a matrix shape, a scanning circuit for shutter scanning a shutter signal for discharging accumulated signal charges and starting exposure in a vertical direction of the plural pixels by a unit of a row, and a scanning circuit for readout scanning a readout signal for ending the exposure and reading out accumulated signal charges in the vertical direction of the plural pixels by a unit of a row, an exposure time of the imaging part being controlled by the shutter signal and the readout signal; an exposure time setting portion for setting an exposure time of the imaging part; and digital zoom portion for setting a zoom magnification when a digital zoom operation mode is selected for enlarging an image imaged by the imaging part, and enlarging the image imaged by the imaging part at the zoom magnification set. The imaging apparatus includes: an imaging range setting portion for setting an imaging range in a vertical direction of the imaging part according to the zoom magnification set by the digital zoom portion; and a driving portion for outputting a driving signal for scanning the shutter signal and the readout signal to perform exposure in the imaging range set by the imaging range setting portion at the exposure time set by the exposure time setting portion and driving the imaging part. The exposure time setting portion includes a calculating portion for calculating, when the zoom magnification is changed by the digital zoom portion, a maximum exposure time of the imaging part on the basis of the zoom magnifications before the change and after the change to prevent a shutter signal for scanning the imaging range corresponding to the zoom magnification after the change from interfering with a readout signal for scanning the imaging range corresponding to the zoom magnification before the change. The exposure time setting portion sets an exposure time of the imaging part not to exceed the maximum exposure time calculated by the calculating portion.

An imaging method according to an embodiment of the invention is an imaging method including a step of setting a zoom magnification when a digital zoom operation mode is selected for enlarging an image imaged by a imaging part of an X-Y address type, in which an exposure time is controlled by a shutter signal for starting an exposure for scanning plural pixels arranged in a matrix shape in a vertical direction and a readout signal for ending the exposure, and enlarging the image imaged by the imaging part at the zoom magnification set. The imaging method includes the steps of: setting, when the digital zoom operation mode is selected, a maximum exposure time of the imaging part to a predetermined time shorter than a vertical scanning period of the readout signal and setting an exposure time of the imaging part not to exceed the maximum exposure time set; setting an imaging range in a vertical direction of the imaging part according to the zoom magnification set in the digital zoom step; and outputting a driving signal for scanning the shutter signal and the readout signal to perform exposure in the imaging range set in the imaging range setting step at the exposure time set in the exposure time setting step and driving the imaging part. The digital zoom step includes a step of setting, when the zoom magnification is changed, a maximum rate of change of the zoom magnification on the basis of the maximum exposure time set in the exposure time setting step to prevent a shutter signal for scanning the imaging range corresponding the zoom magnification after the change from interfering with a readout signal for scanning the imaging range corresponding to the zoom magnification before the change. In the digital zoom step, the zoom magnification is changed not to exceed the maximum rate of change set in the maximum-rate-of-change setting step.

An imaging apparatus according to an embodiment of the invention is an imaging apparatus including: an imaging part of an X-Y address type having plural pixels arranged in a matrix shape, a scanning circuit for shutter scanning a shutter signal for discharging accumulated signal charges and starting exposure in a vertical direction of the plural pixels by a unit of a row, and a scanning circuit for readout scanning a readout signal for ending the exposure and reading out accumulated signal charges in the vertical direction of the plural pixels by a unit of a row, an exposure time of the imaging part being controlled by the shutter signal and the readout signal; and a digital zoom portion for setting, when a digital zoom operation mode for enlarging an image imaged by the imaging part is selected, a zoom magnification and enlarging the image imaged by the imaging part at the zoom magnification set. The imaging apparatus includes: an exposure time setting portion for setting, when a digital zoom operation mode for operating the digital zoom portion is selected, a maximum exposure time of the imaging part to a predetermined time shorter than a vertical scanning period of the readout signal and setting an exposure time of the imaging part not to exceed the maximum exposure time set; an imaging range setting portion for setting an imaging range in a vertical direction of the imaging part according to the zoom magnification set by the digital zoom portion; and a driving portion for outputting a driving signal for causing the scanning circuit for a shutter to scan a shutter signal and causing the scanning circuit for readout to scan a readout signal to perform exposure in the imaging range set by the imaging range setting portion at the exposure time set by the exposure time setting portion and driving the imaging part. The digital zoom portion includes a maximum-rate-of-change setting portion for setting, when the zoom magnification is changed, a maximum rate of change of the zoom magnification on the basis of the maximum exposure time set by the exposure time setting portion to prevent a shutter signal for scanning the imaging range corresponding to the zoom magnification after the change from interfering with a readout signal for scanning the imaging range corresponding to the zoom magnification before the change. The digital zoom portion changes the zoom magnification not to exceed the maximum rate of change set by the maximum-rate-of-change setting portion.

An imaging device according to an embodiment of the invention is an imaging device comprising: an imaging area including a plurality of pixels, a shutter scanning circuit which sends scanning signals for discharging signal charges accumulated in said imaging area, a readout scanning circuit which sends scanning signals for reading out the signal charges accumulated in said imaging area, an exposure time set portion which sets an exposure time of the imaging device, wherein the exposure time is controlled by said shutter scanning circuit and said readout scanning circuit, a digital zoom portion which enlarges an image imaged by the imaging area according to a set value of a zoom magnification, an imaging range control portion which controls an imaging range in a vertical direction of the imaging area according to the zoom magnification; and a discarding portion which discards at least one of images imaged right before and right after a change of the zoom magnification.

DESCRIPTION OF THE PREFERRED EMBODIMENTS

According to an embodiment of the invention, a imaging part of an X-Y address type is used. The imaging part has plural pixels arranged in a matrix shape, a scanning circuit for shutter scanning a shutter signal for discharging accumulated signal charges and starting exposure in a vertical direction of the plural pixels by a unit of a row, and a scanning circuit for readout scanning a readout signal for ending the exposure and reading out accumulated signal charges in the vertical direction of the plural pixels by a unit of a row, an exposure time of which is controlled by the shutter signal and the readout signal. When a digital zoom operation mode is selected, an imaging range in a vertical direction of the imaging part is set according to a zoom magnification of a digital zoom and a shutter signal and a readout signal is scanned to perform exposure of the imaging range set in a set exposure time to drive the imaging part. When the zoom magnification is changed, a maximum exposure time of the imaging part is calculated on the basis of the zoom magnifications before and after the change to prevent a shutter signal for scanning the imaging range corresponding to the zoom magnification after the change from interfering with a readout signal for scanning the imaging range corresponding to the zoom magnification before the change. An exposure time of the imaging part is set not to exceed the maximum exposure time calculated.

First Embodiment

An imaging apparatus and an imaging method in a first embodiment of the invention will be hereinafter explained with reference to the accompanying drawings.

Figure 1:
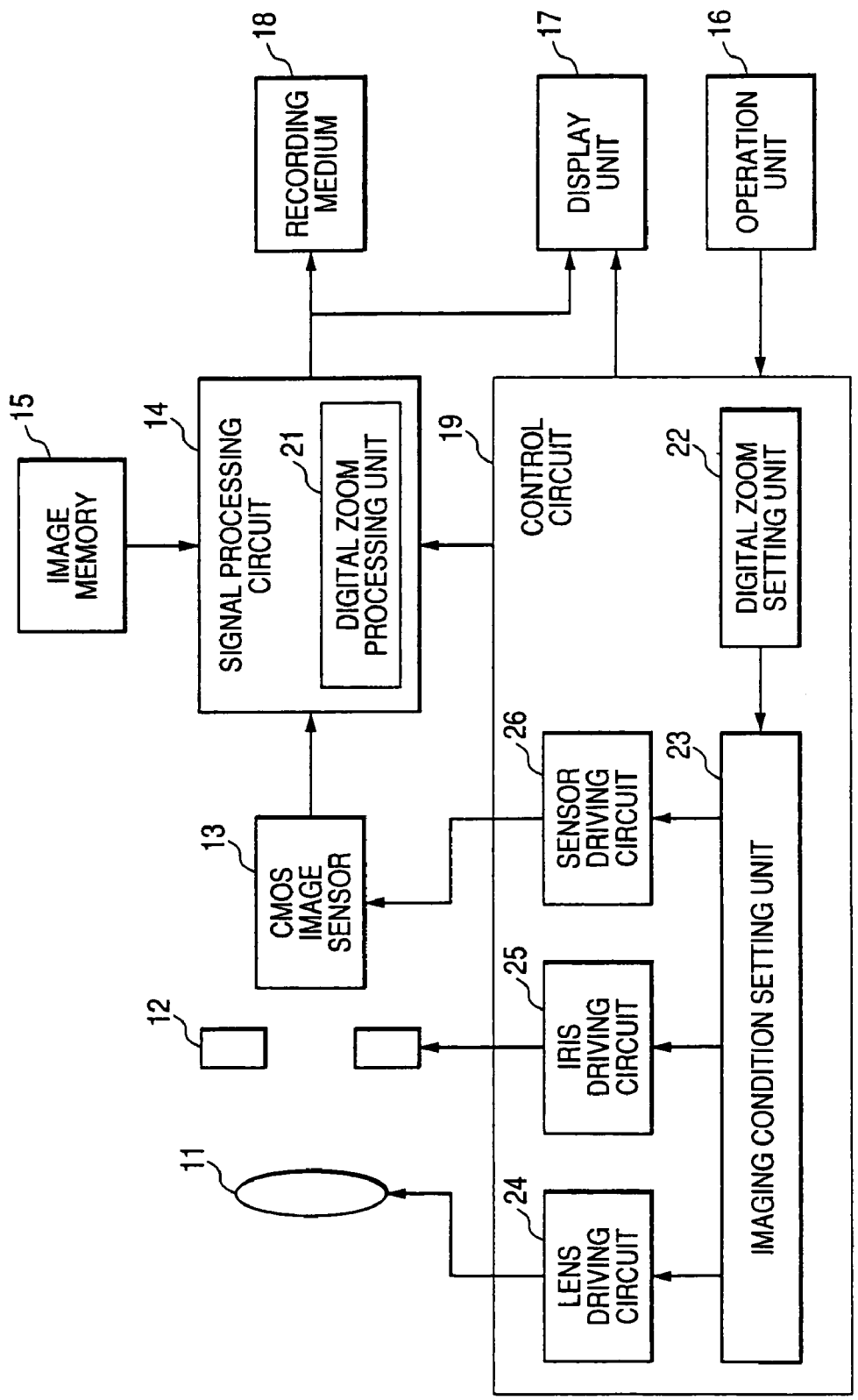
FIG. 1 is a block diagram showing a schematic constitution of an imaging apparatus in a first embodiment of the invention.

FIG. 1 is a block diagram showing a schematic constitution of the imaging apparatus in the first embodiment.

As shown in FIG. 1, the imaging apparatus in the first embodiment includes a lens 11, an iris 12, a CMOS image sensor 13, a signal processing circuit 14, an image memory 15, an operation unit 16, a display unit 17, a recording medium 18, and a control circuit 19.

The lens 11 is, for example, a zoom lens and focuses a subject on the CMOS image sensor 13. Note that the lens 11 is not limited to the zoom lens and may be, for example, a single focus lens. The iris 12 adjusts an aperture amount and serves as a mechanical shutter. The CMOS image sensor 13 images the subject focused by the lens 11. Note that the imaging part is not limited to the CMOS image sensor and may be any imaging part as long as the imaging part is a imaging part of an X-Y address type.

The signal processing circuit 14 applies various kinds of signal processing to the image imaged by the CMOS image sensor 13. The signal processing circuit 14 includes a digital zoom processing unit 21 enlarging the image imaged by the CMOS image sensor 13. An image imaged by the CMOS image sensor 13 and converted into a digital signal by the signal processing circuit 14 is stored in the image memory 15. The image memory 15 is used for signal processing of the signal processing circuit 14. The operation unit 16 includes a not-shown operation button, operation lever, and the like for inputting various kinds of operation information. The display unit 17 is, for example, a liquid crystal display and displays an output image of the signal processing circuit 14 and information on the imaging apparatus. The recording medium 18 is, for example, a replaceable magnetic tape, an optical disk, or a memory card and records an output image of the signal processing circuit 14.

The control circuit 19 controls the lens 11, the iris 12, the CMOS image sensor 13, the signal processing circuit 14, the image memory 15, and the display unit 17 on the basis of operation information inputted by the operation unit 16. The control circuit 19 includes a digital zoom setting unit 22, an imaging condition setting unit 23, a lens driving unit 24, an iris driving unit 25, and a sensor driving unit 26.

The digital zoom setting unit 22 selects (sets and cancels) a digital zoom operation mode on the basis of zoom information inputted from the operation unit 16. When the digital zoom operation mode is selected (set), the digital zoom setting unit 22 sets a digital zoom magnification on the basis of the zoom information and sets an imaging range in a vertical direction of the CMOS image sensor 13 on the basis of the digital zoom magnification set. When the digital zoom operation mode is selected (set), the digital zoom setting unit 22 controls the digital zoom processing circuit 21. The digital zoom processing circuit 21 enlarges an image in a zoom range imaged by the CMOS image sensor 13 according to a control instruction of the digital zoom setting unit 22.

The imaging condition setting circuit 23 sets an optical zoom magnification (a zoom position) of the lens 11, an aperture amount of the iris 12, and an exposure time (shutter speed) of the CMOS image sensor 13 on the basis of the operation information inputted by the operation unit 16.

The lens driving unit 24 drives the lens 11 according to the optical zoom magnification set by the imaging condition setting circuit 23. The iris driving unit 25 drives the iris 12 according to the aperture amount set by the imaging condition setting circuit 23. The sensor driving unit 26 drives the CMOS image sensor 13 at the exposure time set by the imaging condition setting circuit 23. When the digital zoom operation mode is selected by the digital zoom setting unit 22, the sensor driving unit 26 drives the CMOS image sensor 13 to image the imaging range set by the digital zoom setting unit 22.

Figure 2:
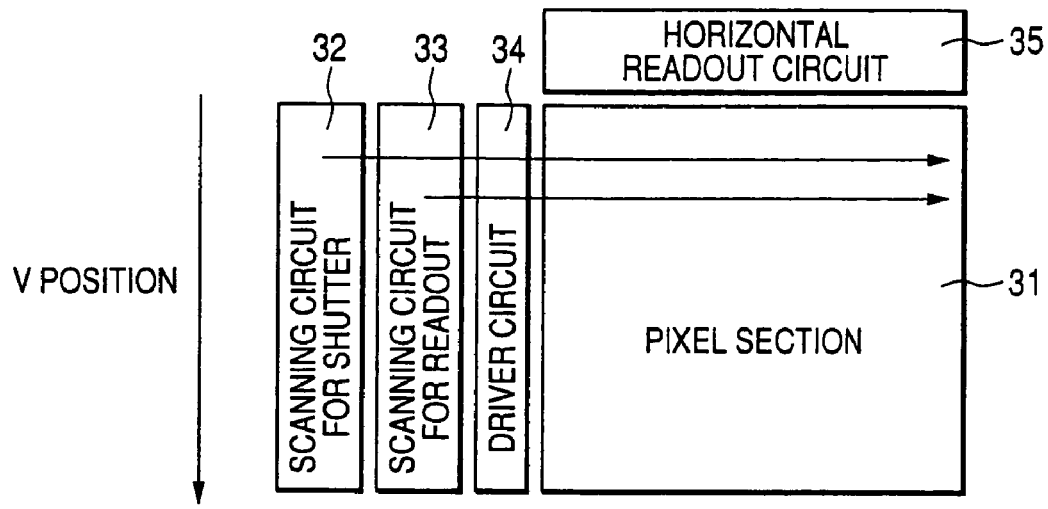
FIG. 2 is a diagram showing a constitution of a CMOS image sensor 13 shown in FIG. 1.

FIG. 2 is a diagram showing a constitution of the CMOS image sensor 13 shown in FIG. 1.

As shown in FIG. 2, the CMOS image sensor 13 includes a pixel section 31, a scanning circuit for shutter 32, a scanning circuit for readout 33, a driver circuit 34, and a horizontal readout circuit 35.

The pixel section 31 includes not-shown plural pixels arranged in a matrix shape. Each of the pixels includes a photoelectric conversion section converting incident light made incident on the CMOS image sensor 13 into a signal charge (a pixel signal), a transistor circuit for shutter discharging signal charges accumulated in the photoelectric conversion section and starting exposure, a transistor circuit for amplification amplifying the signal charges accumulated in the photoelectric conversion section, and a transistor circuit for readout reading out the signal charges amplified by the transistor circuit for amplification. The photoelectric conversion section is, for example, a photodiode. When the transistor circuit for shutter is driven, the photodiode discharges the accumulated signal charges and initializes a pixel signal. When the transistor circuit for readout is driven, after the accumulated signal charges are read out, the photodiode performs destructive readout for initializing the pixel signal.

The scanning circuit for shutter 32 scans a shutter signal for driving the transistor circuits for shutter of the plural pixels of the pixel section 31 on the basis of a driving signal for shutter from the sensor driving unit 26 in a vertical direction of the plural pixels of the pixel section 31 by a unit of a row via the driver circuit 34. The scanning circuit for shutter 32 is, for example, a decoder circuit selecting an arbitrary row of the plural pixels and scanning the row.

The scanning circuit for readout 33 scans a readout signal for driving the transistor circuits for readout of the plural pixels of the pixel section 31 on the basis of a driving signal for readout from the sensor driving unit 26 in the vertical direction of the plural pixels by a unit of a row via the driver circuit 34. The scanning circuit for readout 33 is, for example, a decoder circuit selecting an arbitrary row of the plural pixels and scanning the row.

The driver circuit 34 drives the pixel section 31 according to the shutter signal from the scanning circuit for shutter 32 and the readout signal from the scanning circuit for readout 33. The horizontal readout circuit 35 collectively reads out pixel signals of pixels on the same row of the pixel section 31 selected on the basis of a readout signal from the scanning circuit for readout 33 and applies parallel-serial conversion to the pixel signal for one line read out to output the pixel signal.

In the imaging apparatus constituted in this way, the respective units are operated according to control instructions of the control circuit 19 based on operation information of the operation unit 16. The imaging condition setting circuit 23 sets an optical zoom magnification of the lens 11, an aperture amount of the iris 12, and an exposure time (shutter speed) of the CMOS image sensor 13. The lens driving unit 24 drives the lens 11. The iris driving unit 25 drives the iris 12. The sensor driving unit 26 drives the CMOS image sensor 13. An image imaged by the CMOS image sensor 13 is subjected to signal processing by the signal processing circuit 14, displayed on the display unit 17, and recorded in the recording medium 18.

When the digital zoom operation mode is selected by the digital zoom setting unit 22 on the basis of operation information (zoom information) of the operation unit 16, the digital zoom setting unit 22 sets a digital zoom magnification and an imaging range of the CMOS image sensor 13 corresponding to the digital zoom magnification. The sensor driving circuit 26 drives the CMOS image sensor 13 to image the imaging range set. The image imaged by the CMOS image sensor 13 is stored in the image memory 15. The digital zoom processing unit 21 slices a zoom range to perform enlargement processing.

Figure 3:
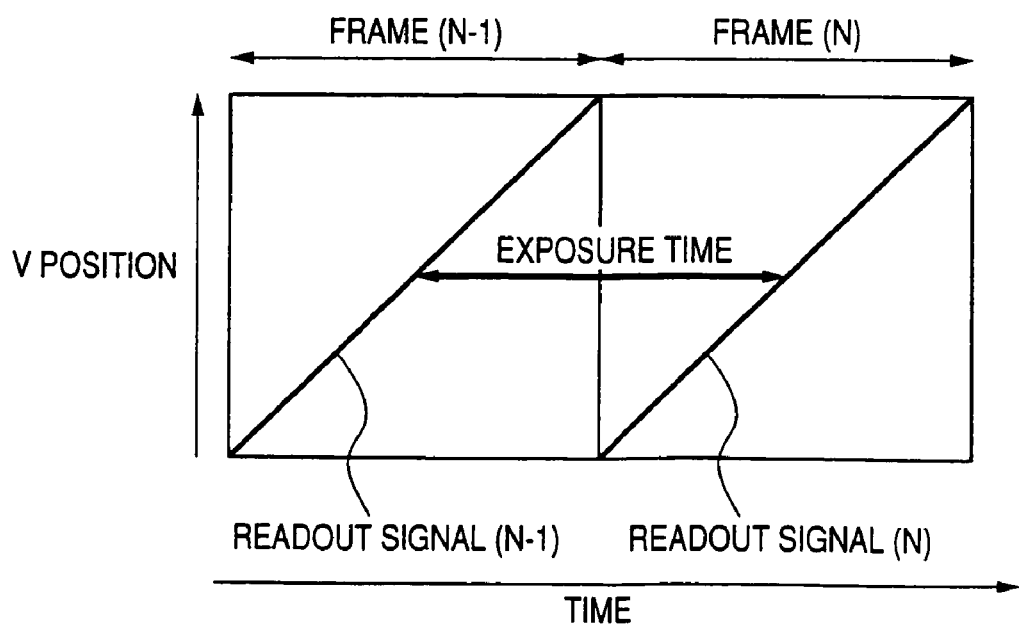
FIG. 3 is a diagram showing an operation of the CMOS image sensor 13.

FIG. 3 is a diagram showing an operation of the CMOS image sensor 13.

The operation is an operation for releasing a so-called one-frame shutter. When an exposure time is set to one frame period, a driving signal for shutter is not given to the scanning circuit for shutter 32 and a driving signal for readout is given to the scanning circuit for readout 33. A readout signal scanned by the scanning circuit for readout 33 performs scanning in a vertical direction of the pixels section 31 by a unit of a row in one frame period. A shutter operation is performed according to the readout signal.

Figure 4:
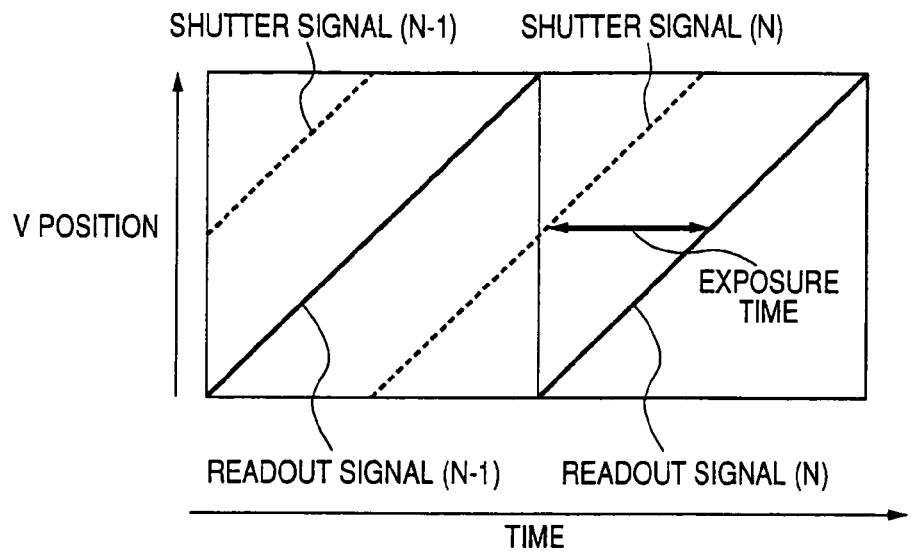
FIG. 4 is a diagram showing an operation of the CMOS image sensor 13.

FIG. 4 is a diagram showing an operation of the CMOS image sensor 13.

The operation is an operation for driving the scanning circuit for shutter 32 to control an exposure time. The exposure time is controlled in a range from 1H to 1F-1H. When the exposure time is set to a time shorter than one frame period, a driving signal for shutter is given to the scanning circuit for shutter 32 and a driving signal for readout is given to the scanning circuit for readout 33. A shutter signal scanned by the scanning circuit for shutter 32 and a readout signal scanned by the scanning circuit for readout 33 perform scanning in the vertical direction of the pixel section 31 by a unit of row in one frame period.

Figure 5:
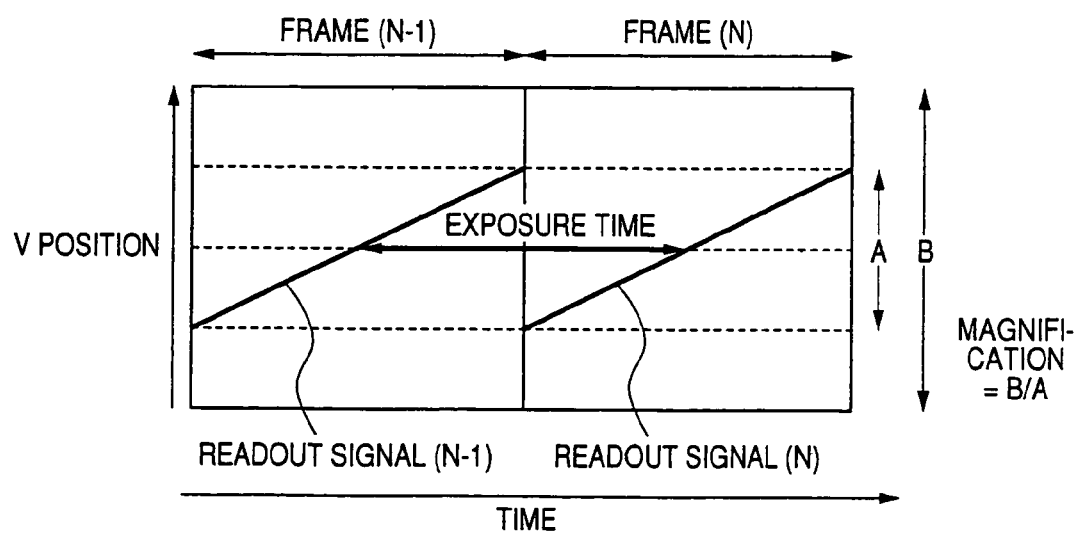
FIG. 5 is a diagram showing an operation of the CMOS image sensor 13.

FIG. 5 is a diagram showing an operation of the CMOS image sensor 13.

In FIG. 5, A indicates an image range in a vertical direction of the pixel section 31 that is set by the digital zoom setting unit 22 on the basis of a digital zoom magnification (B/A). B indicates an image range in the vertical direction of the pixel section 31 at the time when digital zoom is not performed. When the digital zoom operation mode is selected, imaging in the imaging range A is performed and an image is read out from the CMOS image sensor 13. When an exposure time is set to one frame period, a driving signal for shutter is not given to the scanning circuit for shutter 32 and a driving signal for readout is given to the scanning circuit for readout 33. A readout signal scanned by the scanning circuit for readout 33 performs scanning in a vertical direction of the imaging range A by a unit of a row in one frame period. A shutter operation is performed according to a readout signal.

Figure 6:
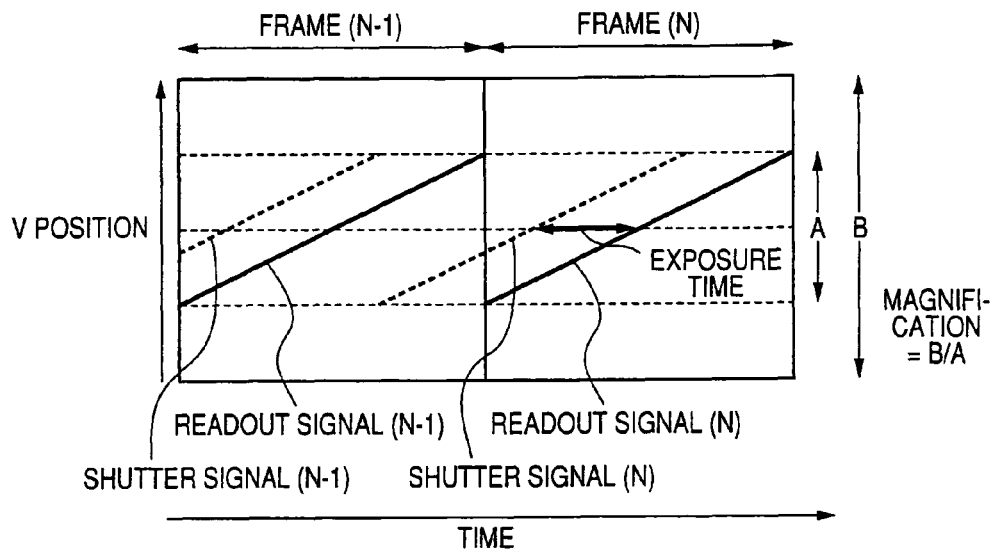
FIG. 6 is a diagram showing an operation of the CMOS image sensor 13.

FIG. 6 is a diagram showing an operation of the CMOS image sensor 13.

In FIG. 6, A indicates an imaging range in the vertical direction of the pixel section 31 that is set by the digital zoom setting unit 22 on the basis of a digital zoom magnification (B/A) B indicates an imaging range in the vertical direction of the pixel section 31 at the time when digital zoom is not performed. When the digital zoom operation mode is selected, imaging in the imaging range A is performed and an image is read out from the CMOS image sensor 13. When the digital zoom operation mode is selected, it is also possible to drive the scanning circuit for shutter 32 to control an exposure time. The exposure time is controlled in a range from 1H to 1F-1H. When the exposure time is set to a time shorter than one frame period, a driving signal for shutter is given to the scanning circuit for shutter 32 and a driving signal for readout is given to the scanning circuit for readout 33. A shutter signal scanned by the scanning circuit for shutter 32 and a readout signal scanned by the scanning circuit for readout 33 perform scanning in a vertical direction of the imaging range A by a unit of a row in one frame period.

Figure 7:
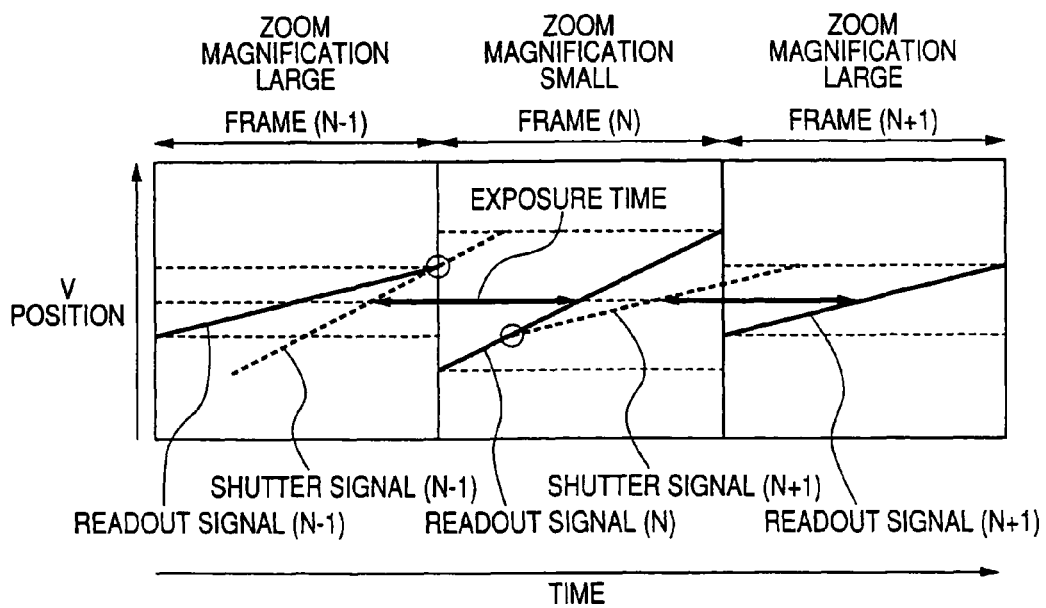
FIG. 7 is a diagram showing interference between a readout signal and a shutter signal.

FIG. 7 is a diagram showing interference between a readout signal and a shutter signal.

As shown in FIG. 7, when a digital zoom magnification is changed, an imaging range in the vertical direction of the pixel section 31 changes and a scanning speed of a shutter signal and a readout signal changes. In such a case, a readout signal and a shutter signal used for imaging at a fixed frame rate may interfere with each other. For example, in FIG. 7, as an example of a case in which a digital zoom magnification is reduced and an imaging range is increased, a shutter signal in a frame (N) is timed to coincide with a readout signal in a frame (N−1) in a last row thereof and, when an exposure time is longer than this, imaging for frames before and after the frame (N) is not performed normally. On the other hand, as an example of a case in which a digital zoom magnification is increased and an imaging range is reduced, a shutter signal in a frame (N+1) is timed to coincide with a readout signal in a frame (N) in a start row thereof and, when an exposure time is longer than this, imaging for frames before and after the frame (N+1) is not performed normally. In this way, when a digital zoom magnification is changed, an exposure time is limited.

In the imaging apparatus in the first embodiment, when a digital zoom magnification is changed, images before and after an image imaged by the CMOS image sensor 13 are discarded by the control circuit 19 to prevent the images from being used. Images before the images discarded are used instead of the discarded images.

In this way, according to the first embodiment, an imaging range set by the digital zoom setting unit 22 on the basis of a digital zoom magnification is imaged by the CMOS image sensor 13.

Therefore, it is possible to read out an image in the image range corresponding to the digital zoom magnification from an imaging part. Thus, it is possible to reduce a capacity of the image memory 15 storing a read-out image to thereby reduce cost of the imaging apparatus.

Images before and after change of a digital zoom magnification are discarded to prevent the images from being used. Thus, it is possible to discard images that are likely to be not imaged normally because of interference between a readout signal of the later image and a shutter signal of the earlier image and prevent irregularities of a video.

Second Embodiment

In the first embodiment, when a digital zoom magnification is changed, images before and after the change imaged by the CMOS image sensor 13 are discarded by the control circuit 19 to prevent the images from being used. Consequently, even when there is no interference between a readout signal and a shutter signal as shown in FIG. 7, the images before and after the change are discarded. On the other hand, an imaging apparatus in the second embodiment does not discard the images when there is no interference between a readout signal and a shutter signal. Note that, in the second embodiment, differences from the first embodiment are explained.

The digital zoom setting unit 22 of the imaging apparatus in the second embodiment calculates, when a digital zoom magnification is changed, a maximum exposure time during which there is no interference between a readout signal and a shutter signal on the basis of digital zoom magnifications before and after the change and compares the maximum exposure time calculated and an exposure time set by the imaging condition setting unit 23. When comparison information of the digital zoom setting unit 22 indicates that the exposure time set by the condition setting unit 23 exceeds the calculated maximum exposure time, the control circuit 19 discards images imaged by the CMOS image sensor 13 before and after change of digital zoom to prevent the images from being used and uses images before the images discarded instead of the discarded images.

The maximum exposure time is represented by, for example, the following expression.

$$\text{Maximum exposure time} = 1 + \text{MAX}(Z(N-1), Z(N))/\text{MIN}(Z(N-1), Z(N)) \times F/2$$

where Z (N−1) is a digital zoom magnification of a frame (N−1), N(N) is a digital zoom magnification of a frame (N), and F is one frame period.

Figures 8, 9:
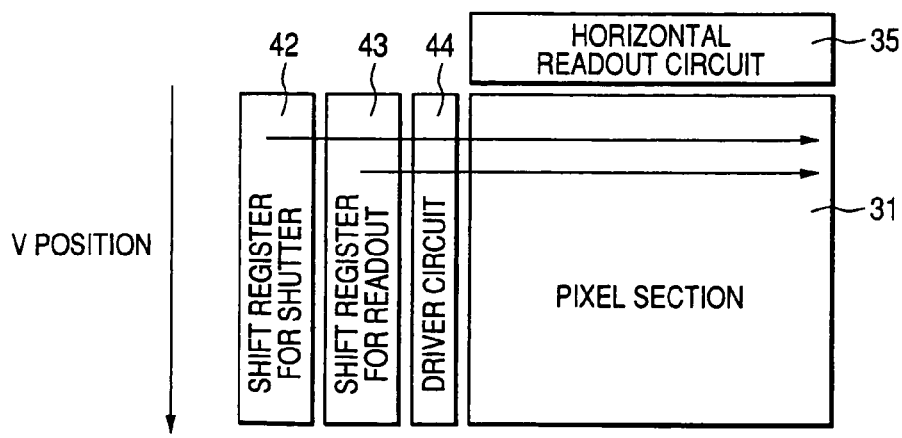
FIG. 8 is a diagram showing an example of a maximum exposure time at the time when a digital zoom magnification is changed.
FIG. 9 is a diagram showing a constitution of a CMOS image sensor of an imaging apparatus in a fifth embodiment of the invention.

FIG. 8 is a diagram showing an example of a maximum exposure time at the time when a digital zoom magnification is changed.

As it is understood from FIG. 8, when a digital zoom magnification is not changed, a maximum exposure time is one frame period. When a digital zoom magnification is changed, a maximum exposure time is shorter than one frame period. A maximum exposure time at the time when a magnification is changed to a magnification ten times as large as the magnification and a maximum exposure time at the time when a magnification is changed to a magnification 1/M times as large as the magnification coincide with each other. The digital zoom setting unit 22 may store maximum exposure times shown in FIG. 8 instead of calculating a maximum exposure time according to the expression and calculate a maximum exposure time according to table lookup.

In this way, according to the second embodiment, images for which a readout signal and a shutter signal do not interfere with each other are not discarded and only images for which a readout signal and a shutter signal interfere with each other are discarded. Thus, it is possible to obtain a video with smooth motions compared with the first embodiment.

Third Embodiment

In a third embodiment of the invention, differences from the first and the second embodiments are explained.

As in the second embodiment, the digital zoom setting unit 22 of the imaging apparatus in the third embodiment calculates a maximum exposure time when a digital zoom magnification is changed. The imaging condition setting circuit 23 sets an exposure time not to exceed the maximum exposure time calculated by the digital zoom setting unit 22.

In this way, according to the third embodiment, even when a digital zoom magnification is changed, it is possible to image a normal image without irregularities with the CMOS image sensor 13. Thus, it is unnecessary to discard images before and after the change of the digital zoom magnification as in the first and the second embodiments.

Fourth Embodiment

In a fourth embodiment of the invention, differences from the first to the third embodiments are explained.

The imaging condition setting circuit 23 in the fourth embodiment sets, when the digital zoom operation mode is selected by the digital zoom setting unit 22, a maximum exposure time to one half of one frame period and sets an exposure time not to exceed the maximum exposure time set. The digital zoom setting unit 22 limits a rate of change of a digital zoom magnification on the basis of the maximum exposure time set by the imaging condition setting circuit 23.

As shown in FIG. 8, when a digital zoom magnification is changed from one time to sixteen times and when a digital zoom magnification is changed from sixteen times to one time, a maximum exposure time is 0.53. Therefore, when a maximum exposure time is set to 0.5, if a zoom magnification changes in this range, there is no interference between a readout signal in a frame (N−1) and a shutter signal in a frame (N).

In this way, according to the fourth embodiment, even when a digital zoom magnification is changed, it is possible to image a normal image without irregularities with the CMOS image sensor 13. Thus, it is unnecessary to discard images before and after the change of the digital zoom magnification as in the first and the second embodiments.

Fifth Embodiment

FIG. 9 is a diagram showing a constitution of a CMOS image sensor of an imaging apparatus in a fifth embodiment of the invention.

As shown in FIG. 9, the CMOS image sensor includes the pixel section 31, a shift register for shutter 42, a shift register for readout 43, a driver circuit 44, and the horizontal readout circuit 35.

Components identical with those in the CMOS image sensor shown in FIG. 2 are denoted by identical reference numerals. Explanations of the components are omitted.

The shift register for shutter 42 sequentially scans a shutter signal for driving transistor circuits for shutter of plural pixels of the pixel section 31 in a vertical direction of the plural pixels of the pixel section 31 by a unit of a row via the driver circuit 34 on the basis of a driving signal for shutter (a shift register input pattern signal and a shift clock signal) from the sensor driving unit 26. The shift register for readout 43 sequentially scans a readout signal for driving transistor circuits for readout of plural pixels of the pixel section 31 in a vertical direction of the plural pixels by a unit of a row via the driver circuit 34 on the basis of a driving signal for readout (a shift register input pattern signal and a shift clock signal) from the sensor driving unit 26. The driver circuit 44 drives the pixel section 31 on the basis of a shutter signal (bit position information) of the scanning circuit for shutter 42 and a readout signal (bit position information) of the scanning circuit for readout 33.

The CMOS image sensor in the fifth embodiment performs the same operation as the CMOS image sensor in the first embodiment shown in FIGS. 3 to 6. In the operation of the CMOS image sensor in the fifth embodiment, there is interference between a readout signal and a shutter signal as in the operation of the CMOS image sensor in the first embodiment shown in FIG. 7. Consequently, the imaging apparatus in the fifth embodiment performs imaging under conditions without interference between a readout signal and a shutter signal as in the imaging apparatus in the third and the fourth embodiment. When interference between a readout signal and a shutter signal occurs as in the imaging apparatus in the second embodiment, the imaging apparatus discards images that are not imaged normally because of the interference. When a digital zoom magnification is changed as in the imaging apparatus in the first embodiment, the imaging apparatus discards images imaged before and after the change of the zoom magnification.

Figure 10A:
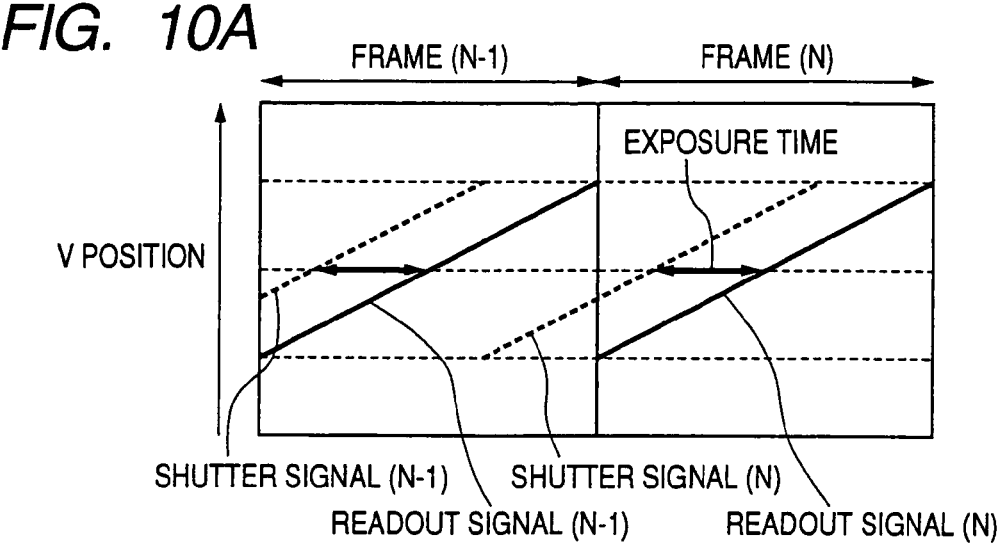
FIGS. 10A to 10C are diagrams showing a problem of interference between shutter signals.
Figure 10B:
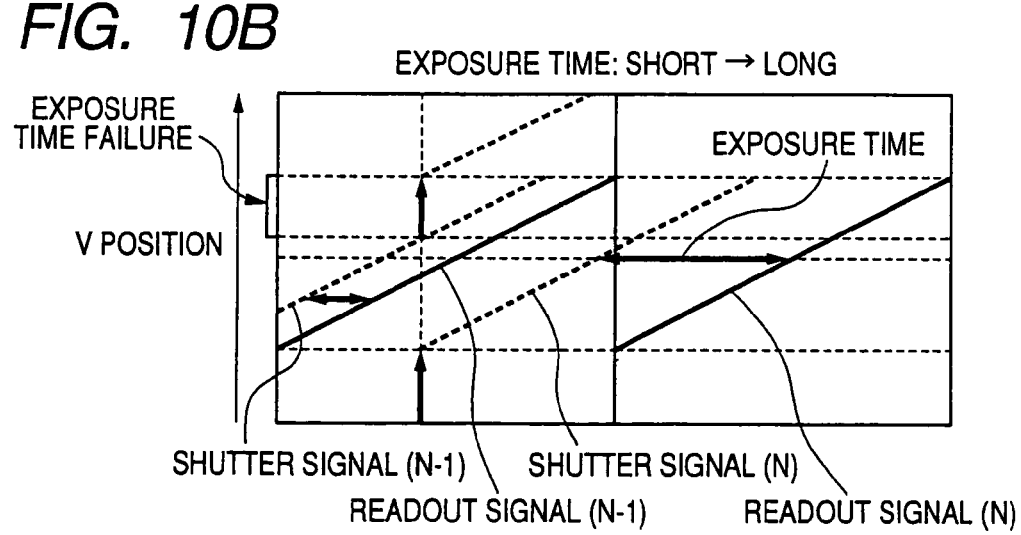
Figure 10C:
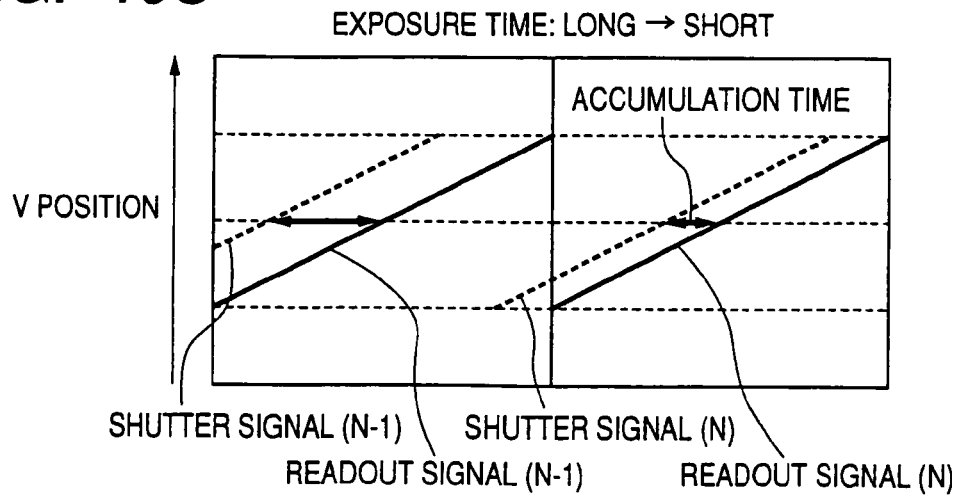

FIGS. 10A to 10C are diagrams showing a problem of interference between shutter signals.

In the CMOS image sensor in the fifth embodiment, a shutter signal is scanned by the shift register for shutter 42 and a readout signal is scanned by the shift register for readout 43. When the digital zoom operation mode is selected, the shutter signal and the readout signal are shifted at high speed from a first row of the pixel section 31 and a start row of an imaging range and shifted at high speed from an end row of the imaging range to a last row of the pixel section 31. Consequently, when an exposure time is changed to be long, abnormality occurs in an image in a previous frame (N−1).

As shown in FIG. 10A, when an exposure time is fixed, a shutter signal in a frame (N−1) and a shutter signal in a frame (N) do not interfere with each other like readout signals in the respective frames. As shown in FIG. 10C, when an exposure time is changed to be short, a shutter signal in the frame (N–1) and a shutter signal in the frame (N) do not interfere with each other either.

On the other hand, as shown in FIG. 10B, when an exposure time is changed to be large, a shutter signal in the frame (N) interfered with a shutter signal in the frame (N–1). In other words, when the shutter signal in the frame (N) is shifted at high speed from a first row of the pixel section 31 to a start row of an imaging range, the shutter signal in the frame (N–1) is also shifted at high speed. Thus, abnormality occurs in the frame (N–1).

Therefore, when an exposure time is changed to be long at the time of digital zoom, the control circuit 19 of the imaging apparatus in the fifth embodiment discards an image before the change and uses an image before the image discarded instead of the discarded image.

In this way, according to the fifth embodiment, when an exposure time is changed to be long at the time of digital zoom, images not imaged normally are eliminated. Therefore, it is possible to prevent irregularities of a video.

Sixth Embodiment

Figure 11:
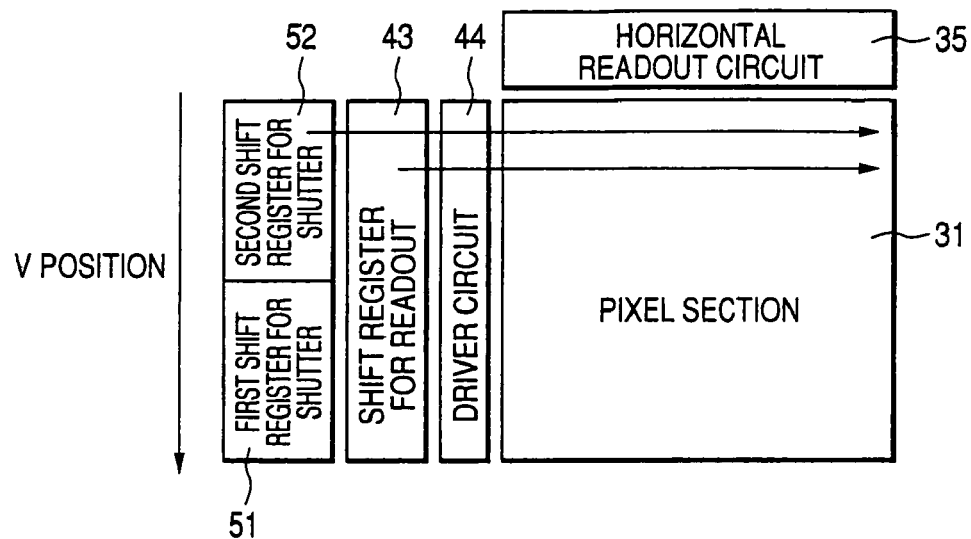
FIG. 11 is a diagram showing a constitution of a CMOS image sensor of an imaging apparatus in a sixth embodiment of the invention.

FIG. 11 is a diagram showing a constitution of a CMOS image sensor of an imaging apparatus in a sixth embodiment of the invention.

As shown in FIG. 11, in the CMOS image sensor in the sixth embodiment, the shift register for shutter 42 of the CMOS image sensor in the fifth embodiment shown in FIG. 9 is replaced with a first shift register for shutter 51 and a second shift register for shutter 52. The first and the second shift registers for shutter 51 and 52 are divided substantially in the center of the pixel section 31 and driven by independent shutter driving signals, respectively.

In the CMOS image sensor in the sixth embodiment, the first and the second shift registers for shutter 51 and 52 are driven by independent shutter driving signals, respectively. Thus, even if a shutter signal in a frame (N) is shifted at high speed by the first shift register for shutter 51, it is possible to normally shift a shutter signal in a frame (N–1) with the second shift register for shutter 52.

According to the sixth embodiment, even when an exposure time is set long, it is possible to perform a normal imaging operation. Thus, when the exposure time is changed to be long as in the fifth embodiment, it is unnecessary to discard images before the change.

Seventh Embodiment

Figure 12:
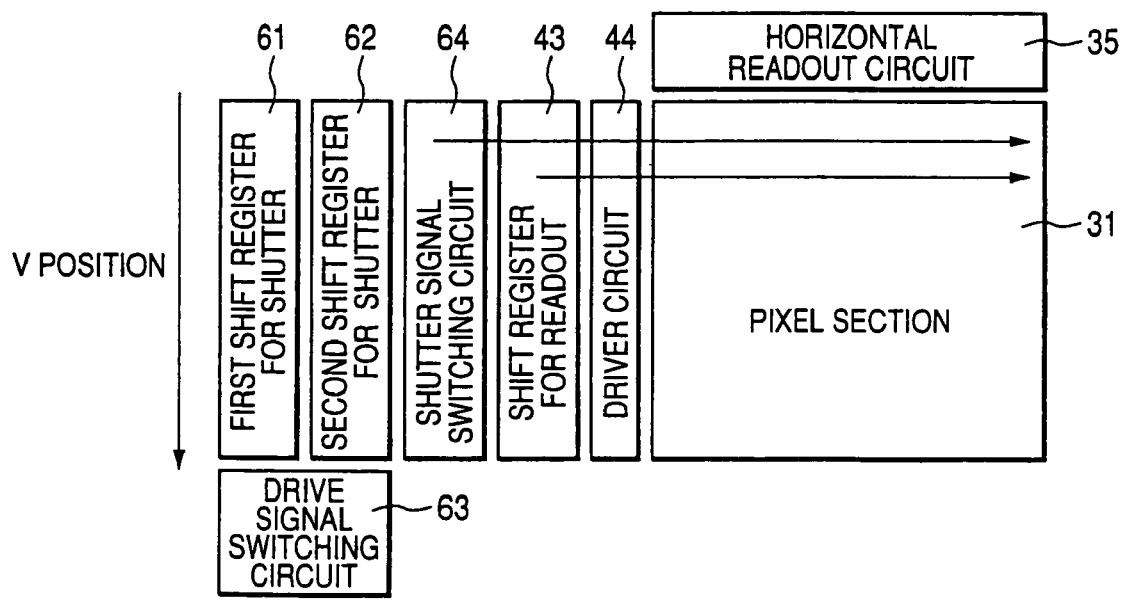
FIG. 12 is a diagram showing a constitution of a CMOS image sensor of an imaging apparatus in a seventh embodiment of the invention.

FIG. 12 is a diagram showing a constitution of a CMOS image sensor of an imaging apparatus in a seventh embodiment of the invention.

As shown in FIG. 12, in the CMOS image sensor in the seventh embodiment, the shift register for shutter 42 of the CMOS image sensor in the fifth embodiment shown in FIG. 9 is replaced with a first shift register for shutter 61, a second shift register for shutter 62, a driving signal switching circuit 63, and a shutter signal switching circuit 64.

Driving signals for shutter (a shift register input pattern signal and a shift clock signal) are inputted to the driving signal switching circuit 63. The driving signal switching circuit 63 alternately switches and outputs the inputted driving signals for shutter to the first and the second shift registers for shutter 61 and 62 in an order of imaging. Consequently, shutter signals are alternately outputted in an order of imaging by the first and the second shift registers for shutter 61 and 62. The shutter signal switching circuit alternately switches and outputs the shutter signals alternately outputted by the first and the second shift registers for shutter 61 and 62 in an order of imaging.

In the CMOS image sensor in the seventh embodiment, as in the CMOS image sensor in the sixth embodiment, even if a shutter signal in a frame (N) is shifted at high speed by the first shift register for shutter 51, it is possible to normally shift a shutter signal in a frame (N–1) with the second shift register for shutter 52.

According to the seventh embodiment, even when an exposure time is set long, it is possible to perform a normal imaging operation. Thus, when the exposure time is changed to be long as in the fifth embodiment, it is unnecessary to discard images before the change.

According to the imaging method and the imaging apparatus in an embodiment of the invention, an imaging range in the vertical direction of the imaging part is set according to a zoom magnification of the digital zoom, and a shutter signal and a readout signal are scanned to perform exposure in the imaging range set to drive the imaging part. When the zoom magnification of the digital zoom is changed, images imaged by the imaging part before and after the change of the zoom magnification are discarded to prevent the images from being used.

Therefore, since it is possible to read out an image in an imaging range corresponding to the zoom magnification from the imaging part, it is possible to reduce a capacity of a memory storing the image read out to thereby reduce cost of the imaging apparatus. Images before and after change of the zoom magnification are discarded to be prevented from being used. Thus, it is possible to eliminate images that are likely to be not imaged normally because of interference between a readout signal of the later image and a shutter signal of the earlier image and prevent irregularities of a video outputted from the imaging apparatus.

According to the imaging method and the imaging apparatus in another embodiment of the invention, an imaging range in the vertical direction of the imaging part is set according to a zoom magnification of the digital zoom and a shutter signal and a readout signal are scanned to perform exposure in the imaging range set at a set exposure time to drive the imaging part. When the zoom magnification is changed, a maximum exposure time of the imaging part is calculated on the basis of the zoom magnifications before and after the change to prevent a shutter signal for scanning the imaging range corresponding to the zoom magnification after the change from interfering with a readout signal for scanning the imaging range corresponding to the zoom magnification before the change. When the set exposure time exceeds the maximum exposure time calculated, images imaged by the imaging part before and after the change of the zoom magnification are discarded to prevent the images from being used.

Therefore, since it is possible to read out an image in an imaging range corresponding to the zoom magnification from the imaging part, it is possible to reduce a capacity of a memory storing the image read out to thereby reduce cost of the imaging apparatus. When the set exposure time exceeds the calculated maximum exposure time, images imaged by the imaging part before and after the change of the zoom magnification are discarded to be prevented from being used. Thus, it is possible to eliminate images that are not imaged normally because of interference between a readout signal of the later image and a shutter signal of the earlier image and prevent irregularities of a video outputted from the imaging apparatus.

According to the imaging method and the imaging apparatus in still another embodiment of the invention, an imaging range in the vertical direction of the imaging part is set according to a zoom magnification of the digital zoom and a shutter signal and a readout signal are scanned to perform exposure in the imaging range set in a set exposure time to drive the imaging part. When the zoom magnification is changed, a maximum exposure time of the imaging part is calculated on the basis of the zoom magnifications before and after the change to prevent a shutter signal for scanning the imaging range corresponding to the zoom magnification after the change from interfering with a readout signal for scanning the imaging range corresponding to the zoom magnification before the change. An exposure time of the imaging part is set not to exceed the maximum exposure time calculated.

Therefore, since it is possible to read out an image in an imaging range corresponding to the zoom magnification from the imaging part, it is possible to reduce a capacity of a memory storing the image read out to thereby reduce cost of the imaging apparatus. When the zoom magnification is changed, a maximum exposure time of the imaging part is calculated on the basis of the zoom magnifications before and after the change to prevent a shutter signal for scanning the imaging range corresponding to the zoom magnification after the change from interfering with a readout signal for scanning the imaging range corresponding to the zoom magnification before the change. An exposure time of the imaging part is set not to exceed the maximum exposure time calculated. Thus, even when the zoom magnification is changed, it is possible to image a normal image without irregularities with the imaging part.

According to the imaging method and the imaging apparatus in still another embodiment of the invention, when the digital zoom operation mode is selected, a maximum exposure time of the imaging part is set to a predetermined time shorter than a vertical scanning period of a readout signal, an exposure time of the imaging part is set not to exceed the maximum exposure time set, an imaging range in the vertical direction of the imaging part is set according to a set zoom magnification, and a shutter signal and a readout signal are scanned to perform exposure of the imaging range set at the exposure time to drive the imaging part. When the zoom magnification is changed, a maximum rate of change of the zoom magnification is set on the basis of the maximum exposure time to prevent a shutter signal for scanning the imaging range corresponding to the zoom magnification after the change from interfering with a readout signal for scanning the imaging range corresponding to the zoom magnification before the change. The zoom magnification is changed not to exceed the maximum rate of change set.

Therefore, since it is possible to read out an image in an imaging range corresponding to a zoom magnification, it is possible to reduce a capacity of a memory storing the image read out to thereby reduce cost of the imaging apparatus. When the zoom magnification is changed, a maximum rate of change of the zoom magnification is set on the basis of the maximum exposure time to prevent a shutter signal for scanning the imaging range corresponding to the zoom magnification after the change from interfering with a readout signal for scanning the imaging range corresponding to the zoom magnification before the change. The zoom magnification is changed not to exceed the maximum rate of change set. Thus, even when the zoom magnification is changed, it is possible to image a normal image without irregularities with the imaging part.

The embodiment explained above is a case in which the present invention is applied to an imaging apparatus. However, also, the present invention can be applied to an imaging device. The imaging device may include an imaging area, an exposure time set portion, a digital zoom portion, an imaging range control portion and a discarding portion on one chip. The corresponding elements are described in FIG. 1 of the embodiment explained above. In this case the elements are driven corresponding to the order from outside of the chip, for example, the other chips.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging method comprising the steps of:
    setting an exposure time of a imaging part of an X-Y address type, in which an exposure time is controlled by a shutter signal for starting exposure for scanning plural pixels arranged in a matrix shape in a vertical direction and a readout signal for ending the exposure; and
    setting a zoom magnification when a digital zoom operation mode is selected for enlarging an image imaged by a imaging part, and enlarging the image imaged by the imaging part at the zoom magnification set;
    setting an imaging range in a vertical direction of the imaging part according to the zoom magnification set in the digital zoom step;
    outputting a driving signal for scanning the shutter signal and the readout signal to perform exposure in the imaging range set in the imaging range setting step at the exposure time set in the exposure time setting step and driving the imaging part;
    calculating, when the zoom magnification is changed in the digital zoom step, a maximum exposure time of the imaging part on the basis of the zoom magnifications before the change and after the change to prevent a shutter signal for scanning the imaging range corresponding to the zoom magnification after the change from interfering with a readout signal for scanning the imaging range corresponding to the zoom magnification before the change; and
    comparing the maximum exposure time calculated in the calculating step and the exposure time set in the exposure time setting step and discarding, when the exposure time set in the exposure time setting step exceeds the maximum exposure time calculated in the calculating step, images imaged by the imaging part before and after the change of the zoom magnification to prevent the images from being used.

2. An imaging apparatus comprising:
    an imaging part of an X-Y address type having plural pixels arranged in a matrix shape, a scanning circuit for shutter scanning a shutter signal for discharging accumulated signal charges and starting exposure in a vertical direction of the plural pixels by a unit of row, and a scanning circuit for readout scanning a readout signal for ending the exposure and reading out accumulated signal charges in the vertical direction of the plural pixels by a unit of row, an exposure time of the imaging part being controlled by the shutter signal and the readout signal;
    an exposure time setting portion for setting an exposure time of the imaging part; and
    a digital zoom portion for setting a zoom magnification when a digital zoom operation mode is selected for enlarging an image imaged by the imaging part, and enlarging the image imaged by the imaging part at the zoom magnification set;

an imaging range setting portion for setting an imaging range in a vertical direction of the imaging part according to the zoom magnification set by the digital zoom portion;

a driving portion for outputting a driving signal for shutter for causing the scanning circuit for shutter to scan a shutter signal and causing the scanning circuit for readout scan a readout signal to perform exposure in the imaging range set by the imaging range setting portion at the exposure time set by the exposure time setting portion and driving the imaging part;

a calculating portion for calculating, when the zoom magnification is changed by the digital zoom portion, a maximum exposure time of the imaging part on the basis of the zoom magnifications before the change and after the change to prevent a shutter signal for scanning the imaging range corresponding to the zoom magnification after the change from interfering with a readout signal for scanning the imaging range corresponding to the zoom magnification before the change; and a discarding portion for comparing the maximum exposure time calculated by the calculating portion and the exposure time set by the exposure time setting portion and discarding, when the exposure time set by the exposure time setting portion exceeds the maximum exposure time calculated by the calculating portion, images imaged by the imaging part before and after the change of the zoom magnification to prevent the images from being used.

3. An imaging apparatus according to claim 2, wherein the scanning circuit for shutter includes a decoder that is capable of selecting an arbitrary row of the plural pixels.

4. An imaging apparatus according to claim 2, wherein the scanning circuit for shutter includes a shift register sequentially scanning the plural pixels in the vertical direction by a unit of row.

5. An imaging apparatus according to claim 4, wherein the discarding portion discards, when the digital zoom operation mode is selected and when an exposure time is increased by the exposure time setting portion, images imaged by the imaging part before the exposure time is increased to prevent the images from being used.

6. An imaging apparatus according to claim 2, wherein the scanning circuit for shutter includes first and second shift registers independently scanning first and second ranges, respectively, the first and the second ranges being obtained by dividing a scanning range in the vertical direction of the plural pixels substantially in a center thereof.

7. An imaging apparatus according to claim 2, wherein the scanning circuit for shutter includes:
- first and second shift registers to which the driving signal for shutter is alternately inputted in an order of imaging; and
- a switching circuit alternately switching and outputting shutter signals to the plural pixels in the order of imaging.

* * * * *